(12) United States Patent
Vikberg et al.

(10) Patent No.: US 8,768,297 B2
(45) Date of Patent: Jul. 1, 2014

(54) DIFFERENTIATED NETWORK INDICATION

(75) Inventors: Jari Vikberg, Järna (SE); Tomas Nylander, Värmdö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 605 days.

(21) Appl. No.: 12/296,439

(22) PCT Filed: Apr. 12, 2006

(86) PCT No.: PCT/SE2006/000438
§ 371 (c)(1),
(2), (4) Date: Jan. 7, 2009

(87) PCT Pub. No.: WO2007/117184
PCT Pub. Date: Oct. 18, 2007

(65) Prior Publication Data
US 2009/0176479 A1    Jul. 9, 2009

(51) Int. Cl.
*H04M 11/00*    (2006.01)

(52) U.S. Cl.
USPC .............................. 455/406; 455/407; 726/4

(58) Field of Classification Search
USPC ............. 455/405, 406, 407, 408, 409, 404.2,
455/414.1, 422.1, 424, 425, 432.1, 436,
455/440, 443, 456.3, 456.5, 456.6, 552.1,
455/556.1, 556.2; 705/34, 40, 14.46, 14.64,
705/14.53, 14.54, 14.55, 14.56, 14.57,
705/14.58, 909, 77, 52; 379/114.03,
379/114.05, 114.23, 114.26, 114.27,
379/114.28, 115.01, 127.01, 127.05,
379/127.06, 100.04, 114.01; 726/4–7
See application file for complete search history.

(56) References Cited

U.S. PATENT DOCUMENTS

| | | | | |
|---|---|---|---|---|
| 5,970,403 A * | 10/1999 | Alperovich et al. | ........... | 455/406 |
| 6,044,261 A * | 3/2000 | Kazmi | ........... | 455/408 |
| 6,240,091 B1 * | 5/2001 | Ginzboorg et al. | ........... | 370/401 |
| 6,311,054 B1 * | 10/2001 | Korpela | ........... | 455/406 |
| 6,836,653 B1 * | 12/2004 | Kang | ........... | 455/408 |
| 6,839,684 B1 * | 1/2005 | Rissanen et al. | ........... | 705/34 |
| 6,868,267 B1 * | 3/2005 | Briggs et al. | ........... | 455/406 |
| 6,925,160 B1 * | 8/2005 | Stevens et al. | ........... | 379/121.05 |
| 6,968,175 B2 * | 11/2005 | Raivisto et al. | ........... | 455/406 |
| 7,031,697 B2 * | 4/2006 | Yang et al. | ........... | 455/414.1 |
| 7,039,027 B2 * | 5/2006 | Bridgelall | ........... | 370/329 |
| 7,145,994 B2 * | 12/2006 | Moreau et al. | ........... | 379/114.01 |
| 7,298,725 B2 * | 11/2007 | Rune | ........... | 370/338 |

(Continued)

FOREIGN PATENT DOCUMENTS

JP    2004-357041 A    12/2004

*Primary Examiner* — Michael Faragalla
*Assistant Examiner* — Gerald Oliver

(57) ABSTRACT

A system and method in a cellular telecommunication network for indicating tariff-related information to an end user having the ability to access network areas with different charging tariffs. In one embodiment, a Charging Indication Data Base (CIDB) in the access network stores charging indications for different combinations of end users and cell identities, and a Rate Indication Data Base (RIDB) stores tariff information for the core network. When the end user accesses the cellular network through an identified cell, a radio network controller (RNC) retrieves a charging indication from the CIDB and sends it to a Mobile Switching Center (MSC). The MSC uses the charging indication to retrieve tariff-related information from the RIDB and sends it to the end user. The CIDB and RIDB may also be co-located in the core network.

11 Claims, 7 Drawing Sheets

(56) References Cited

U.S. PATENT DOCUMENTS

| | | | |
|---|---|---|---|
| 7,305,229 B2* | 12/2007 | Fox et al. | 455/406 |
| 7,603,102 B1* | 10/2009 | Pryor | 455/406 |
| 7,873,347 B2* | 1/2011 | Zabawskyj et al. | 455/406 |
| 7,933,596 B2* | 4/2011 | Bengtsson | 455/433 |
| 2004/0076144 A1* | 4/2004 | Ishidoshiro | 370/352 |
| 2005/0020252 A1* | 1/2005 | Yang et al. | 455/415 |
| 2005/0043012 A1* | 2/2005 | Benco et al. | 455/406 |
| 2006/0058021 A1* | 3/2006 | Fox et al. | 455/422.1 |
| 2007/0240202 A1* | 10/2007 | Sullivan et al. | 726/4 |

* cited by examiner

DIFFERENTIATED NETWORK INDICATION

FIELD OF INVENTION

The present invention relates to methods and arrangements to indicate tariff related information to an end user located in a cell area, with ability to access network areas with different charging tariffs.

BACKGROUND

For Mobile Stations served by different Public Land Mobile Networks PLMN there is a need to enhance roaming between networks by permitting accurate indication of PLMN identities that are either newer than the Mobile Equipment or have changed their name since the Mobile Equipment was sold. The NITZ (Network Identity and Timezone) principle is described in the standards document 3GPP TS 22.042 V6.0.0 developed within the $3^{rd}$ generation Partnership Project. The document describes how NITZ makes it possible for a serving PLMN to transfer its current identity (as full and short names for network), universal time, Daylight Saving Time and Local Time Zone to Mobile Equipment.

Home or small area Wideband Code Division Multiple Access WCDMA coverage can be provided for limited number of users using small Radio Base Stations RBSs, so called femto radio base stations. A femto radio base station is possible to install by the end user using "plug-and-play" type of installation and provides normal WCDMA coverage for the end users and would be connected to a Radio Network controller RNC using some kind of IP based transmission. One alternative is to use fixed broadband access (like xDSL, Cable etc.) to connect the femto radio base station to the RNC. Another alternative would be to use Mobile Broadband access (e.g. HSDPA and Enhanced Uplink). One of the main drivers of the concept of providing Local or Home 3G Access is to provide cheaper call or transaction rates/charges when connected via the femto radio base station compared to when connected via a macro WCDMA Radio Access Network. This creates requirements to indicate to the end users when a specific rate is applied, which rate consequently needs to be shown in a Graphical User Interface GUI of the User Equipment UE. Today the following three solutions to achieve this exist:

1. Use a different Public Land Mobile Network PLMN code for the Local or Home 3G Access domain compared to the macro WCDMA network. In this case the operator/PLMN name on the GUI is changed whenever the User Equipment moves between the different domains.
2. Use of Cell Broadcast short message Service CBS to indicate a cell name in addition to the operator/PLMN name. In this case the GUI would show both operator/PLMN name and a cell name on the GUI and the Cell name would change whenever the UE moves between the different domains.
3. Configuration of the Subscribe Identity Module SIM or Universal SIM USIM) to provide Service Provider Name indication. The SIM/USIM can be configured with multiple PLMN codes and Location Area codes and whenever the User Equipment moves to an area that is also configured in the SIM/USIM, the string indicating the current Service Provider name is shown in the GUI. In this case, it would be enough to have a specific Location Area Identification (LAI) reserved for the Local or Home 3G Access domain. When the UE moves into the Local or Home 3G Access domain, it would display the Service Provider name and whenever outside this domain, it could show only the operator/PLMN name or another Service Provider name, if configured.

Following problems exist with the existing solutions. The same numbering is used as above:
1. The dividing of an existing network (with one PLMN code) into two different PLMNs needs a lot of administration, configuration and support in the relevant nodes. It is seen that the Local or Home 3G Access domain would be the Home PLMN (HPLMN) for the end users that have purchased the Local or Home 3G Access service and their User Equipments would be searching for the HPLMN periodically while in the WCDMA macro radio network. This means that the battery lifetime of the UE is affected. All end users that have purchased the Local or Home 3G Access service would also need new SIM/USIM cards.
2. CBS has the following two drawbacks:
   a) it can be activated or deactivated by the end users i.e. there is no way to be sure that these messages are received and used by the User Equipments and
   b) activation of CBS decreases also the lifetime of the battery in the UE.
3. Service Provider Name indication means that the SIMs/USIMs of all end users, that have purchased the Local or Home 3G Access service, would need to be configured with this information and it is seen that the administration and configuration needed for this means a significant amount of work. One further problem with this solution is that it doesn't really provide the possibility for showing different information for different users in the same area (e.g. Location Area or PLMN). The identifiers indicating the current area are broadcasted as system information to all users in a cell. So all users in one area would see the same charging indication and, of course, one user in an area would see the same charging indication. This problem can be further described with the following simplified example. User A has access to his/her own femto radio base station (FRBS-1) and another femto radio base station (FRBS-2), which is owned by user B. The operator defines that each user will have charging tariff Z on his own femto radio base station and charging tariff X on femto radio base stations where he has visitor access (like user A on FRBS-2). It would be very complicated to configure the network and SIM/USIM for the needed behaviour described above. Each femto radio base station would need to have their own Location Area defined and then SIM/USIM information for different users would need to be defined differently on each SIM/USIM. Further example of this problem is the following: FRBS-1 would need to broadcast e.g. LAI-1 and LAI-1 is configured on user A's SIM/USIM as "Home coverage" and on user B's SIM/USIM as "Visited Coverage". In the same way the HRBS-2 would broadcast LAI-2 and configured similarly as above. This scenario could be possible for two subscribers, but is not possible for high number of subscribers and different types of femto radio base stations.

SUMMARY OF INVENTION

The present invention relates to a problem how to indicate to an end user, having the possibility to access network areas with different charging tariffs, when a specific tariff is or will be applied. A further problem is to present the tariff without unnecessary administration, configuration and support.

A purpose with the invention is to provide cheaper call or charges for an end user by indicating to the end user when a specific tariff will be applied.

The problems are solved by the invention by selecting in a core network in dependence of the end users cell location, appropriate tariff related information to be sent to the end user.

More in detail, the problems are solved by a method in a telecommunication system to indicate tariff related information to an end user with ability to access network areas with different charging tariffs. The system comprises a Core Network associated with an Access Network that handles different cell areas. The method comprises the following steps:

The end user located within a cell area, access the Access Network via a radio base station handling the cell area.

A charging indication is selected in dependence of access information identified during the access.

In dependence of the selected charging indication, tariff related information to be sent to the end user is selected in the Core Network.

Thus, the object of the invention is to provide cheaper call or charges for an end user and to indicate to the end user when a specific tariff is applied. This object and others are achieved by methods, arrangements, systems and articles of manufacture.

One advantage with the invention is that it provides a method to indicate to the end user the nature of the coverage, e.g. "home" coverage with a home tariff, "normal" coverage with a normal tariff or "hot spot" coverage with another tariff.

Another advantage is that the invention provides a way to do this without an extensive Operation and Maintenance.

The invention will now be described more in detail with the aid of preferred embodiments in connection with the enclosed drawings.

DETAILED DESCRIPTION OF THE INVENTION

Networks of cellular systems are typically divided into Access Network and Core Network. The 3G system in the examples below is based on Wideband Code Division Multiple Access WCDMA technology, over the air interface and thus this technology will be used in the Radio Access Network, whereas the Core Network will be similar to the one existing in GSM, Global System for Mobile Communication. To be noted is that also other systems than WCDMA are applicable for this invention.

Figure 1:
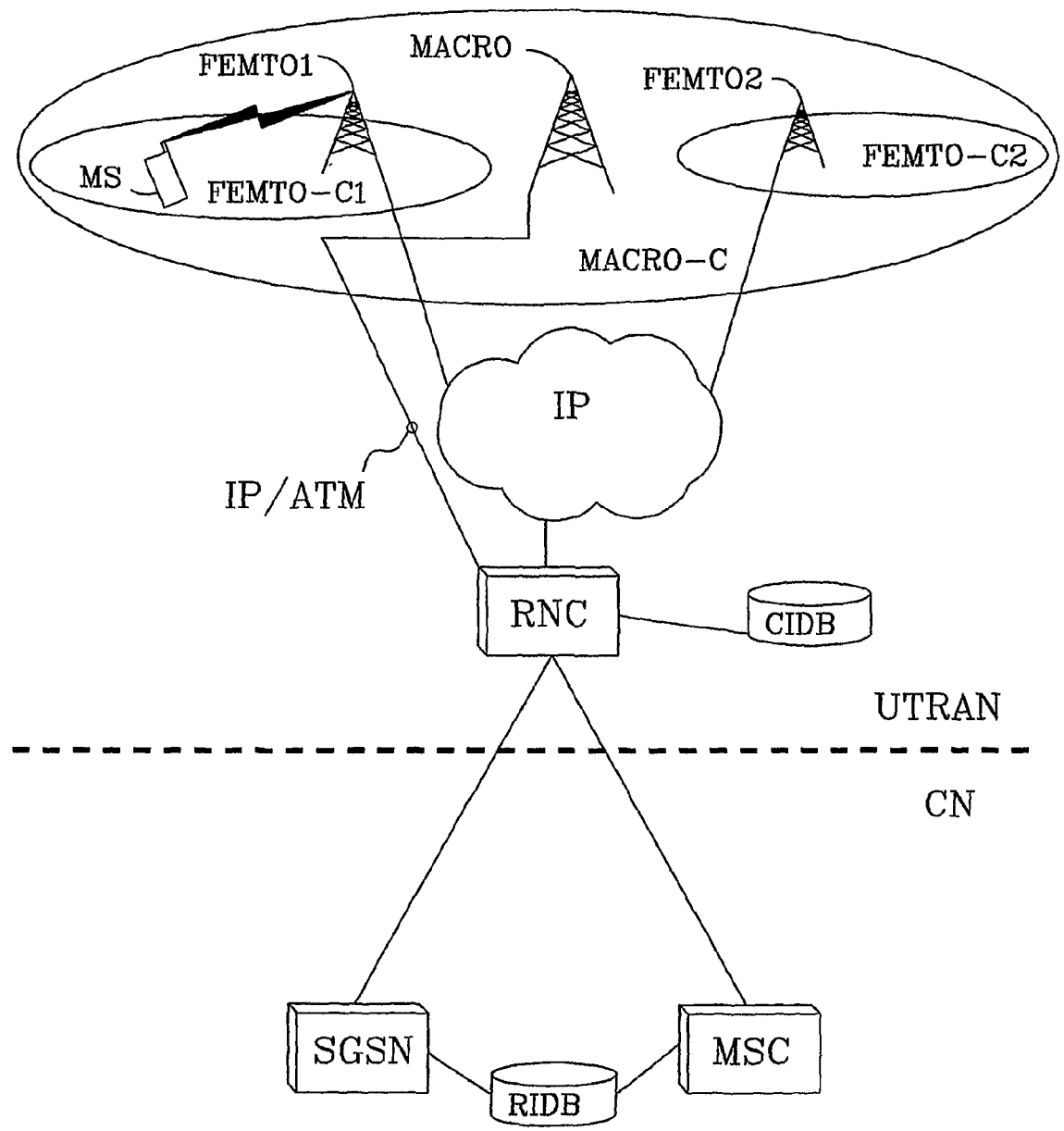
FIG. 1 discloses a telecommunication system comprising a UMTS Terrestrial Radio Access Network handling different femto cells located within a macro cell.

FIG. 1 presents a telecommunication network comprising a Core Network CN and a Radio Access Network UTRAN. The UTRAN is connected to a Serving GPRS Support Node SGSN in Packet Switched Domain and to a Mobile Services Switching Centre MSC in Circuit Switched domain. The Radio Access Network UTRAN, UMTS Terrestrial RAN where UMTS stands for Universal Mobile Telecommunications System, comprises a Radio Network Controller RNC to which the SGSN and the MSC are connected. The RNC handles control of radio connections, such as assignment and release of radio connections and traffic channels, quality control and handover. The RNC is connected via IP/ATM based transmission to a macro radio base station MACRO with radio coverage area constituting a macro cell MACRO-C and connected via IP transmission to micro RBSs, in this application also called femto RBSs FEMTO1 and FEMTO2 each having a radio coverage area representing a femto cell FEMTO-C1 and FEMTO-C2. Multiple femto cells FEMTO-C1 and FEMTO-C2 are located within the macro cell MACRO. An end user MS having a transceiver capable of accessing both macro- and femto-cells is shown in FIG. 1. When the end user is located within the macro cell and roams into a radio coverage area of a femto cell, an attempt to camp on the femto cell is automatically initiated. A specific access control mechanism may be used to allow only predefined end users to camp on the femto cell. In the figure, the end user MS can be seen within the radio coverage area that represents FEMTO-C1. FEMTO-C1 is a "home area" WCDMA coverage for the end user MS in this example. One of the main drivers of the concept of providing local or home 3G access is to provide cheaper call or transaction rates/charges for the end user when connected via for example the home femto RBS compared to when connected via for example the macro WCDMA network.

A Charging Indication Data Base CIDB is connected to the RNC. The CIDB comprises Charging Indications mapped on different combinations of end user and cell identity. The CIDB is in this example a standalone database but can also be a part of the RNC. As an alternative, the CIDB can also be located in the Core Network CN in some specific deployments. The CIDB is used to find out what charging is to be applied for a specific end user when accessing a specific RBS. In some scenarios only the end user identity or only the cell identity can be used to find out the tariff to be indicated towards the CN. This would mean that an end user has a specific agreement that includes the same tariff on all accesses or that the same tariff is to be indicated for all users on a specific cell. Different types of Femto RBSs can for example be defined according to the following: end users own femto RBS (home), another femto RBS (not home but possible to access) or a public hot-spot femto RBS (a "hot-spot" can be a cell area in for example a coffee-shop where an end user can purchase access right to the cell area). Different tariffs may be indicated for the cell depending on which end user is accessing the cell. Some end users can be allowed to use the cell as home cell area rendering a low tariff. Users may also be allowed to use a cell area as a "hot-spot" area meaning another tariff.

A Rate Indication Data Base RIDB is connected to the Mobile Services Switching Centre MSC and to the Serving GPRS Support Node SGSN in the Core Network CN. The RIDB comprises charging indications mapped on information sets that are to be forwarded to end users and tariff rates that are to be handled by the Core Network. The RIDB can be a standalone database but it can also be a part of the MSC and/or the SGSN. The RIDB will be further explained in the embodiments below.

Figure 2:
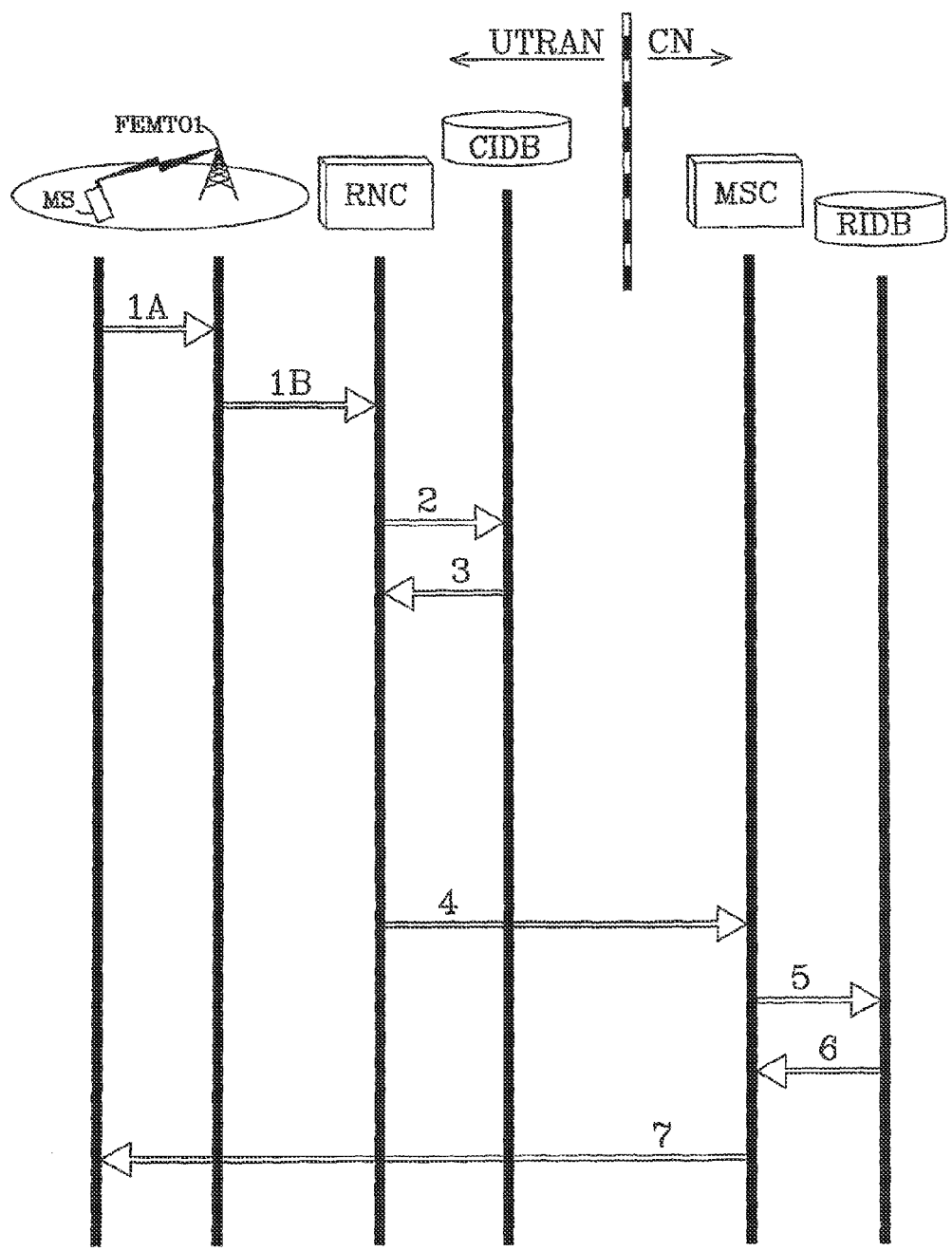
FIG. 2 discloses a signal sequence diagram according to the invention to select and send tariff related information to an end user in the Radio Access Network.

A method according to a first embodiment of the invention will now be explained with aid of FIG. 2. The different entities referred to in FIG. 2, like MS, FEMTO1, RNC, CIDB, MSC and RIDB correspond to the entities that already have been explained and disclosed in FIG. 1. The end user MS is capable of accessing both the macro cell MACRO-C and the femto cell FEMTO1 and roams in this example from the macro cell into the femto cell. The method according to the first embodiment of the invention comprises the following steps:

The end user MS initiates 1A, 1B Radio Access Network UTRAN access to the Radio Network Controller RNC for signalling connection establishment. The RNC knows the cell identity for FEMTO-C1 as it is controlling this cell. As part of the signalling connection establishment, the RNC receives access information received from the radio base station, i.e. International Mobile Subscriber identity IMSI for the end user MS (actually a temporary identity TMSI is normally received that after signalling connection establishment will be transformed to an IMSI by receiving this information from the CN or by the RNC knowing the relation between TMSI and IMSI).

The cell identity for FEMTO-C1 and end user identity IMSI is sent 2 from RNC to the Charging Indication Data Base CIDB.

Stored elements in CIDB are searched to find out the relation between the end user MS and the cell FEMTO-C1. The femto cell was found to be the home area for the end user MS and a Service Area Identity SAI-1 is allocated in CIDB as charging indication for the home femto cells. The end user is predefined as home user in FEMTO1 and thereby has a charging tariff when using FEMTO1 less than the charging tariff when using e.g. MACRO-C. The database CIDB returns 3 the SAI-1 to the RNC.

The charging indication SAI-1 is sent 4 from the Radio Network Controller RNC to the Mobile Services Switching Centre MSC in the Core Network CN.

The SAI-1 is forwarded 5 from the MSC to the Rate Indication Data Base RIDB. The RIDB comprises in this example the following charging indications mapped on information sets and tariff rates. In this example only the SAI-1 entry is used. The other possible entries are Location Area Identities (LAI), Cell Global Identity (CGI) and Charging Type (CT). The CT indication denotes to any charging indication received from the RAN.

| Charging Indication | Information set | Tariff |
| --- | --- | --- |
| LAI-1 | Information set 1 | Tariff 1 |
| LAI-2 | Information set 2 | Tariff 2 |
| SAI-1 | Information set 3 | Tariff 3 |
| SAI-2 | Information set 4 | Tariff 4 |
| CT-x | Information set 5 | Tariff 5 |
| CGI-1 | Information set 6 | Tariff 6 |

Information set 3 and tariff 3 are found to correspond to SAI-1 and are selected in the table. Information set 3 comprises a text message which is "Home cell" in this example. Tariff 3 is a charge indication that is analyzed in the Core Network and later used for charging purposes. The tariff is included here to ensure that the tariff indicated to the end user is also applied in the network. This could also be achieved by using charging indication as input to internal charging analysis in the network. The information set and tariff are sent 6 from the RIDB to the MSC The information contained in the selected information set 3 is sent 7 from the MSC to the User Equipment using an existing standardized mechanism like the NITZ principles (i.e. MM Information message is sent from the MSC to the UE as specified in 3GPP TS 24.008 v6.12.0). In this case the text message "Home Cell" is indicated as short name for network or as full name for network or as both.

The text message "Home cell" is displayed in the Graphical User Interface GUI on the end user's equipment.

The above example with femto cells in a macro cell is no pre-requisite for the invention. Instead of a femto cells, a pico cell that covers for example an office building or a micro cell covering a certain street can be used. In the pico cell case, for example a message "Company Rate" is displayed in the end users GUI.

To be noted is that the exactly same principle could apply for the communication between the end user MS and the Serving GPRS Support Node SGSN. In this case the message is called GMM Information which is defined in 3GPP TS 24.008 v6.12.0.

Figure 3:
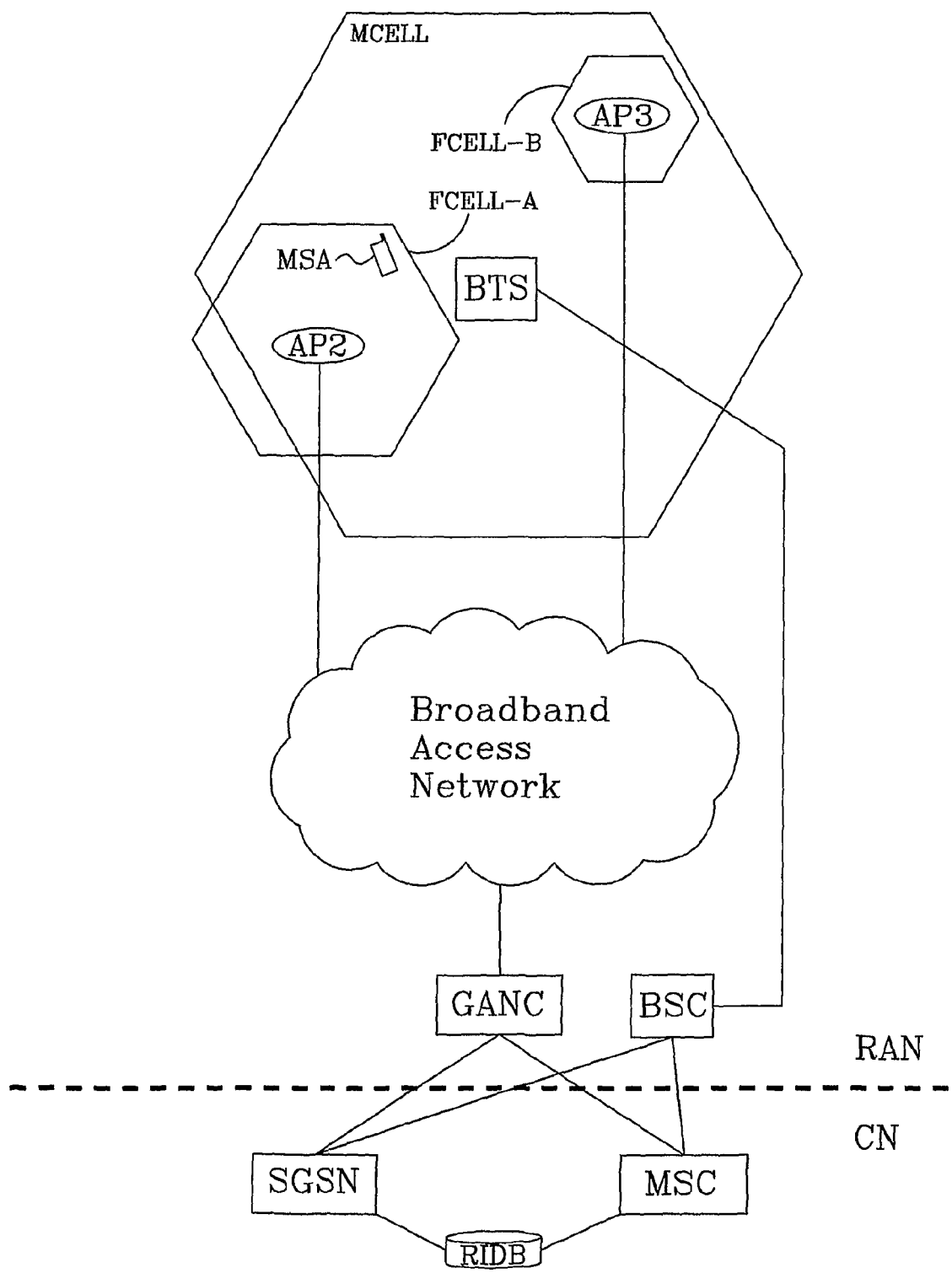
FIG. 3 discloses a telecommunication system comprising a Generic Access Network handling different micro cells located within a macro cell.

FIG. 3 discloses a telecommunication network comprising the Core Network CN and a Generic Access Network GAN. GAN is described in 3GPP TS 43.318 and 44.318. The GAN comprises a GAN Controller GANC and a Broadband Access Network. The GANC is connected to the Mobile Services Switching Centre MSC and to the Serving GPRS Support Node SGSN in CN and connects the mobile voice network to the Broadband Access Network. The GANC performs the similar functions as a base station controller in a GSM/GPRS network. Like in the first embodiment the access network comprises a radio base station with radio coverage area constituting a macro cell MCELL and micro radio base stations with a radio coverage area representing micro cells FCELL-A and FCELL-B. FCELL-A is located partly within the macro cell in this example. An end user i.e. the Mobile Subscriber MSA is located within the radio coverage area of FCELL-A. Each cell is provided by an Access Point AP with connection to the Broadband Access Network. In this example the base station in MCELL, of GSM type, is equivalent to Base Transceiver Station BTS1 in the figure while the base station in FCELL-A is equivalent to AP2 and the base station in FCELL-B is equivalent to AP3. The BTS is controlled by a separate Base Station Controller BSC that is connected to the MSC and the SGSN. The access network which comprises both GAN and GSM Edge Radio Access Network GERAN network is called RAN in FIG. 3. In this case the MSA registers to the GANC and provides both International Mobile Subscriber Identity IMSI and the Access Point AP being used, to the GANC. The GANC is configured with information about associations between different Access Point/Mobile Subscriber combinations to provide the AP point type for each AP-MS combination. The information is in this example stored in the GANC but can also be remotely accessible by the GANC. When a subscriber establishes a signalling connection, the association information is used to select charging indication to be sent towards the MSC in the Core Network. The MSC and SGSN are like in the first embodiment connected to the Rate Indication Data Base RIDB.

Figure 4:
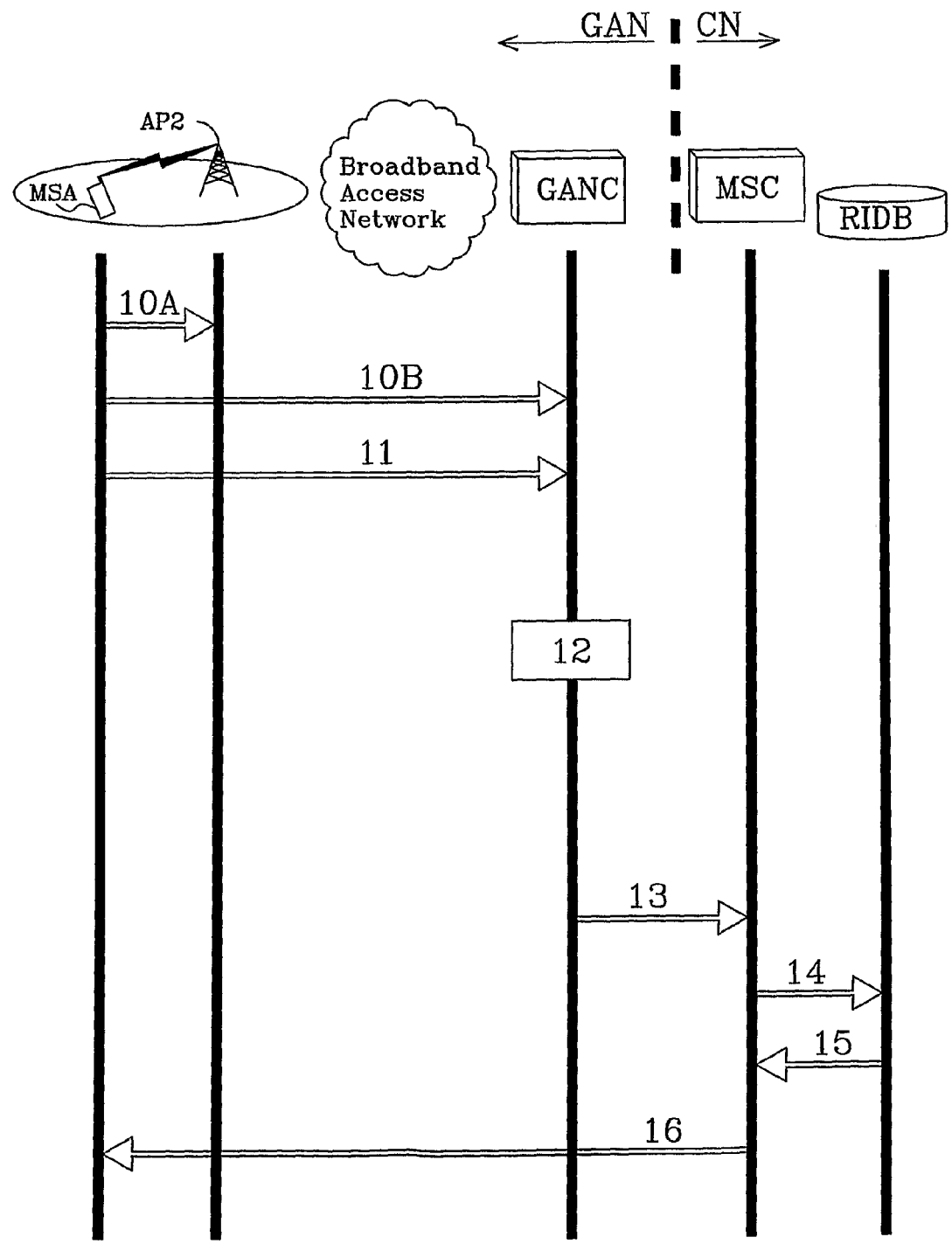
FIG. 4 discloses a signal sequence diagram according to the invention to select and send tariff related information to an end user in the Generic Access Network.

FIG. 4 discloses a method according to a second embodiment of the invention. The different entities referred to in FIG. 4 are the same as the entities that already have been explained and disclosed in FIG. 3. The method according to the second embodiment of the invention comprises the following steps:

The end user MSA gains IP-connectivity via the AP2 10A. Followed by this the MSA performs registration 10B towards the GANC. As part of the registration, the GANC receives information about the current access point being used, i.e. the GANC receives different identifiers (e.g. AP-MAC address or AP's SSID) for the Access Point AP2 representing the radio base station that handles the micro cell FCELL-A. The GANC also receives the identity IMSI from the end user MSA. If the used Access Point would change while the MSA is registered to the GANC, the MSA informs GANC about the new Access Point being used.

The end user MSA initiates 11 access to the Generic Access Network GAN for signalling connection establishment to the Generic Access Network Controller GANC via the Broadband Access Network.

The Access Point AP2 and end user identity IMSI received during registration to the GANC are analyzed 12 in GANC by comparing the combination AP2/IMSI with elements stored in storage in the GANC. The AP2/IMSI combination was found to correspond to a Cell Global Identity CGI-1 representing a charging indication.

The found charging indication CGI-1 is sent 13 from the GANC to the Mobile Services Switching Centre MSC in the Core Network CN.

The CGI-1 is forwarded 14 from the MSC to the Rate Indication Data Base RIDB. The RIDB comprises charging indications mapped on information sets and tariff rates:

| Charging Indication | Information set | Tariff |
|---|---|---|
| LAI-1 | Information set 1 | Tariff 1 |
| LAI-2 | Information set 2 | Tariff 2 |
| SAI-1 | Information set 3 | Tariff 3 |
| SAI-2 | Information set 4 | Tariff 4 |
| CT-x | Information set 5 | Tariff 5 |
| CGI-1 | Information set 6 | Tariff 6 |

Information set 6 and tariff 6 are selected in the table. Information set 6 is a text message "Free Calls". Tariff 6 is analyzed in the Core Network to later be used by the operator for charging purposes. The information set and tariff are sent 15 from the RIDB to the MSC.

The information contained in the selected information set 6 is sent 16 from the MSC to the User Equipment using existing NITZ principles (i.e. MM Information message is sent from the MSC to the UE as specified in 3GPP TS 24.008 v6.12.0). In this case the text message "Free Calls" is indicated as short name for network or as full name for network or as both.

The text message "Free Call" is displayed in a Graphical User Interface on the end user's equipment.

In this embodiment the Access Point AP2 and end user identity IMSI was analyzed by comparing the combination AP2/IMSI with elements pre-stored in GANC. The AP2/IMSI combination was found to correspond to a Cell Global Identity CGI-1 representing the charging indication. The combination of Access points and IMSIs are decided for example by an operator that handles the GANC. A number of predefined IMSIs (i.e. subscribers) can for example be decided to have a lower tariff when using AP2 as access point. Other predefined subscribers can have free calls when using AP2 and yet other predefined subscribers will have "hot spot" displayed in the user interface when using AP3. Obviously these combinations and text strings forwarded to an end user can vary a lot.

Figure 5:
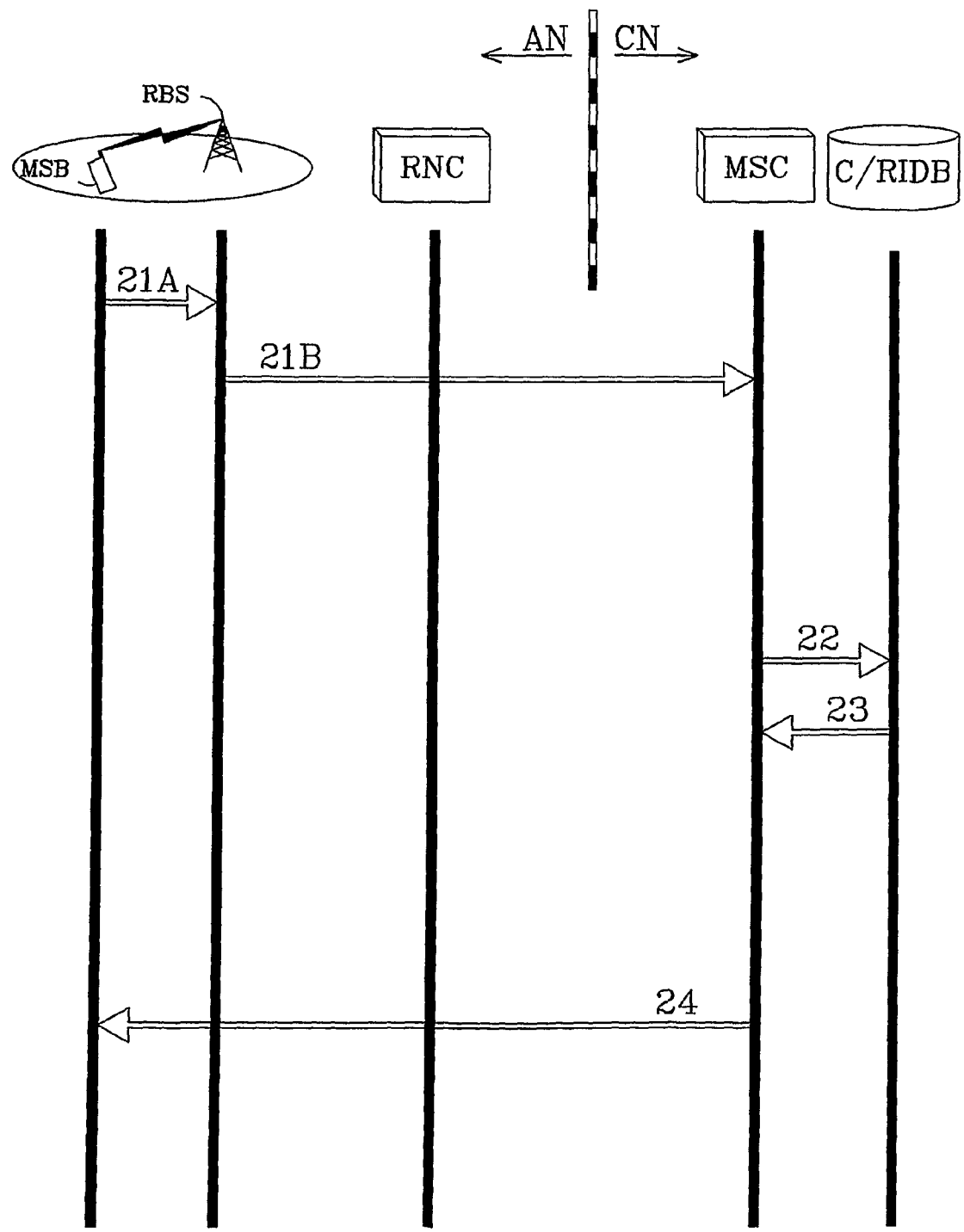
FIG. 5 discloses a signal sequence diagram according to the invention to select and send tariff related information to an end user whereby both Charging and Rate Indication Data bases are located within the Core Network.

FIG. 5 discloses a method according to a third embodiment of the invention. In this embodiment a Charging Indication Data Base and a Rate Indication Data Base like the ones discussed earlier are merged together to a Charging/Rate indication Data Base C/RIDB located in the Core Network. The databases can also be separated within the CN. An end user MSB access an Access Network AN via a Radio Base Station RBS. The Access-Network can be of UTRAN- or GAN-type or of any other existing type. In this example, each cell area has its own Access Point Value APV that defines the cell area's access point to the Access Network. In the UTRAN (and GERAN) case, the RNC knows the APV since it is controlling the RBS. In the GAN case, an AP MAC-address would be received from MSB and in that case the GANC would need to map this to a CGI and each AP will have their own CGI. When the end user access the Access Network, in this example the APV is sent 21A, 21B via the Access Network AN to the MSC in the Core Network CN. The end user's IMSI is already known to the CN according to the standards. The MSC forwards the APV to the C/RIDB. Combinations of IMSI and APV are stored in the C/RIDB and mapped to a CN Internal Identity value CNII. When a suitable CNII is found, an information set mapped to the CNII is sent 23 from the C/RIDB to the MSC and further forwarded from the MSC to the end user MSB using existing NITZ principles as described earlier. A text message corresponding to the information set is shown in the end user's graphical interface.

Figure 6:
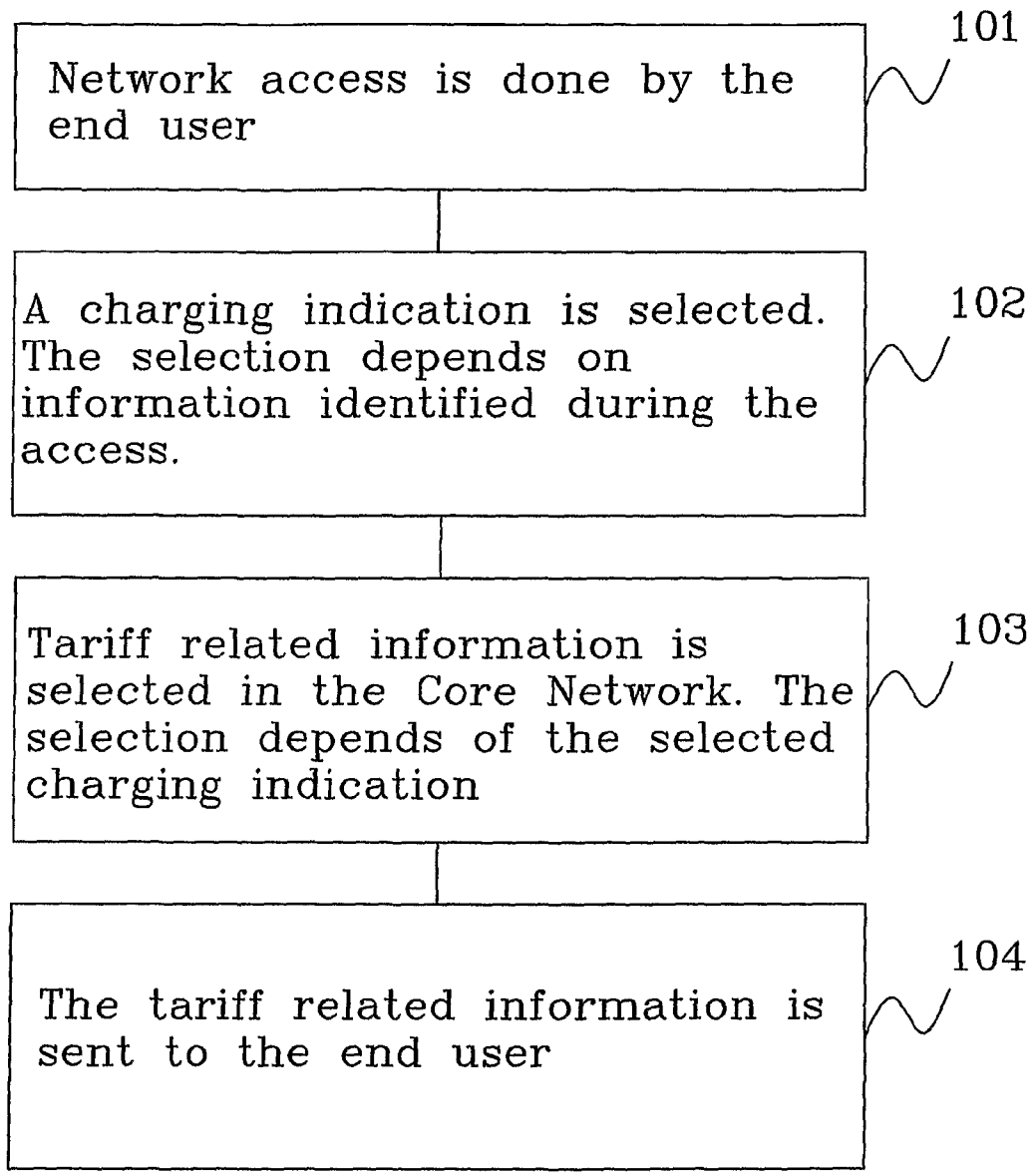
FIG. 6 discloses a flow chart illustrating some essential method steps of the invention.

FIG. 6 discloses a flow chart illustrating some essential method steps of the invention. The flowchart is to be read together with the earlier shown figures. The flowchart comprises the following steps:

The end user (MS; MSA; MSB) access the Access Network (RAN; GAN; AN) via a radio base station handling a cell area (FEMTO-C1; FCELL-A) in which the end user is located; This step is disclosed in FIG. 6 by a block 101.

Selecting a charging indication (SAI, CGI, CNII). The charging indication depends of identified access information. The selection can be performed either in the Access Network or in the Core Network. This step is disclosed in FIG. 6 by a block 102.

Selecting in the Core Network, in dependence of selected charging indication (SAI, CGI, CNII), tariff related information. This step is disclosed in FIG. 6 by a block 103.

Sending the tariff related information to the end user. This step is disclosed in FIG. 6 by a block 104.

Figure 7:
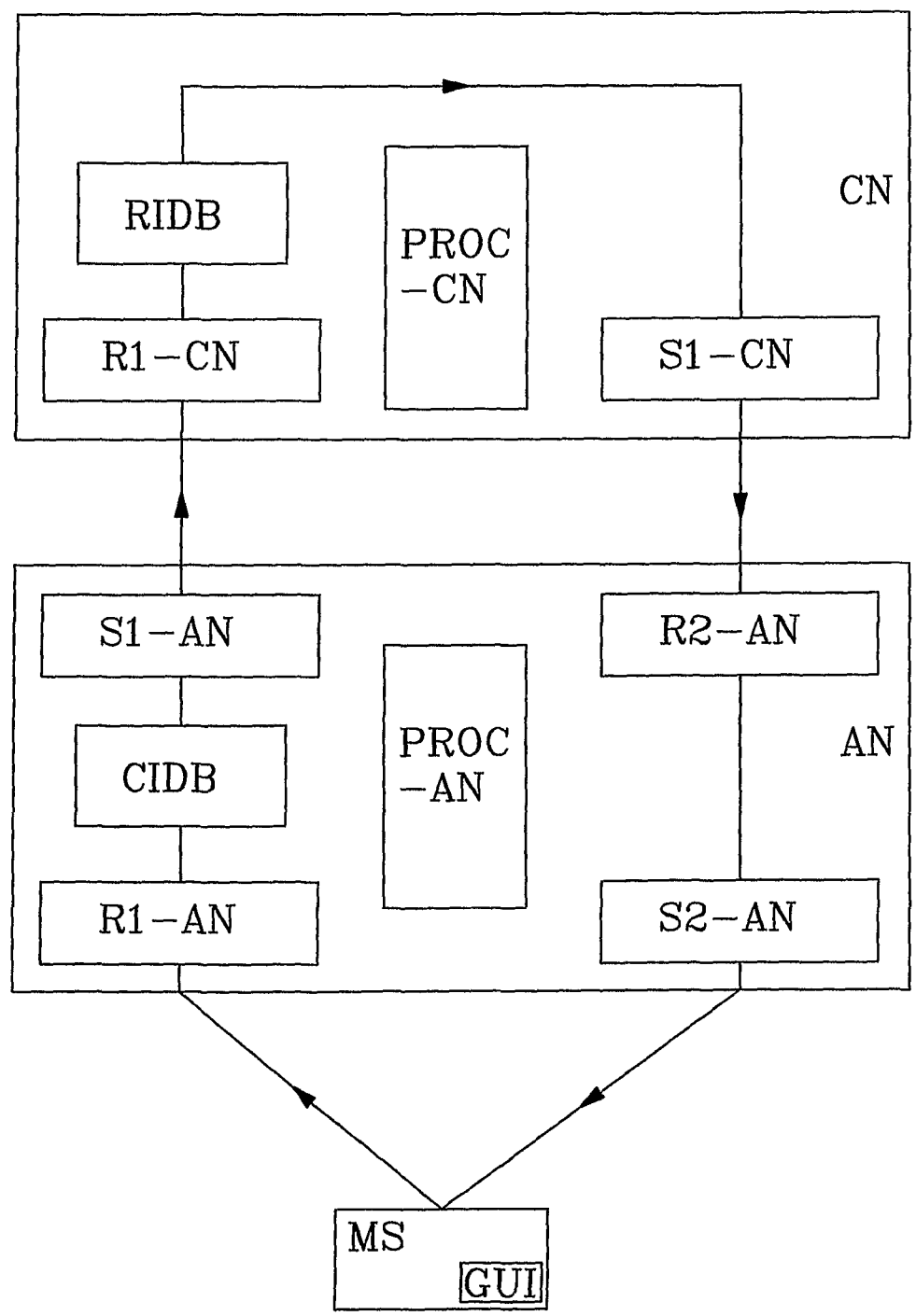
FIG. 7 shows a block schematic illustration of a system according to the invention.

An example of a system used to put the invention into practice is schematically shown in FIG. 7. The block schematic constellation corresponds to the one disclosed in FIG. 1. A first receiver R1-AN in the Access Network AN receives access information from a radio base station in a cell area in which an end user MS is located. A first sender S1-AN transmits charging indications found in the CIDB, that corresponds to the received access information. As already mentioned, the CIDB may be located in the Core Network CN. A first receiver R1-CN in the CN receives the charging indications. A first sender SL-CN in the CN sends tariff related information selected from RIDB, that corresponds to the received charging indication. A second receiver in the AN receives the tariff related information and a second sender S2-AN sends the tariff related information to the end user MS to be displayed in the Graphical User Interface GUI. A processor PROC-AN in the Access Network AN handles the control of data in the AN and a processor PROC-CN in the Core Network CN handles the control of data in CN. Enumerated items are shown in the figure as individual elements. In actual implementations of the invention however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented on any of the Third Generation Partnership Project (3GPP), European Telecommunications Standards Institute (ETSI), American National Standards Institute (ANSI) or other standard telecommunication network architecture. The idea behind the invention is of course also applicable for the case when the end user is present within the macro cell, i.e. also in this case the end user will be aware of rate related information which now concerns the macro cell. A radio base station can be partly configured as femto cell. The invention is in other words not limited to the above described and in the drawings shown embodiments but can be modified within the scope of the enclosed claims.

The invention claimed is:

1. A method in a cellular telecommunication system for indicating a charging rate to a mobile end user located in both a micro cell and an overlying macro cell of an access network, wherein the micro cell and the macro cell have different charging rates, said telecommunication system including a core network connected to the access network, said method comprising the steps of:
   receiving in the access network, an access request from the mobile end user via the micro cell or the macro cell, the access request including an identity of the mobile end user and an identifier of the micro cell or macro cell through which the mobile end user sent the access request;
   selecting in the access network, a charging indication based on the identifier of the micro cell or macro cell and the identity of the mobile end user received in the access request;
   sending the selected charging indication from the access network to the core network;
   based on the selected charging indication, selecting in the core network, a charging rate to be sent to the mobile end user; and
   sending the selected charging rate to the mobile end user prior to the mobile end user incurring charges for network services provided at the selected charging rate.

2. The method according to claim 1, wherein the step of selecting a charging indication in the access network includes an access network controller retrieving the charging indication from a Charging Indication Data Base (CIDB) in the access network based on a predefined stored association between the identifier of the micro cell or macro cell, the mobile end user identity, and the charging indication.

3. The method according to claim 1, further comprising utilizing a Graphical User Interface (GUI) in the mobile end user's equipment to display location-related information and the selected charging rate to the mobile end user.

4. The method according to claim 1, wherein the step of receiving the access request in the access network includes receiving the access request in the access network during a registration procedure, wherein as part of the registration procedure, the access network receives information identifying an access point being utilized.

5. The method according to claim 4, wherein if the access point changes while the mobile end user is registered with the access network, the method includes providing a new access point identity to the access network by the mobile end user.

6. An arrangement in a cellular telecommunication system for indicating a charging rate to a mobile end user located in both a micro cell and an overlying macro cell of an access network, wherein the micro cell and the macro cell have different charging rates, said telecommunication system including a core network connected to the access network, said arrangement comprising:
   an access network node configured to:
      receive an access request from the mobile end user via the micro cell or the macro cell, the access request including an identity of the mobile end user and an identifier of the micro cell or macro cell through which the mobile end user sent the access request;
      select a charging indication based on the identifier of the micro cell or macro cell and the identity of the mobile end user received in the access request; and
      send the selected charging indication to the core network; and
   a core network node configured to:
      receive the selected charging indication from the access network node;
      select a charging rate based on the selected charging indication; and
      send the selected charging rate to the mobile end user prior to the mobile end user incurring charges for network services provided at the selected charging rate.

7. The arrangement according to claim 6, wherein the access network node is an access network controller configured to retrieve the charging information from a Charging Indication Data Base (CIDB) in the access network, wherein the CIDB stores associations between access information and charging indications.

8. The arrangement according to claim 6, wherein the access network node is configured to receive the access request during a registration procedure, wherein as part of the registration procedure, the access network node receives information identifying an access point being utilized.

9. The arrangement according to claim 8, wherein the access network node is configured to obtain a new access point identity if the access point changes while the mobile end user is registered with the access network.

10. A system in a cellular telecommunication network for indicating a charging rate to a mobile end user located in both a micro cell and an overlying macro cell having different charging rates, said system comprising:
   a core network; and
   an access network for providing the mobile end user with access to the core network through different cells, said access network comprising an access network node configured to:
      receive an access request from the mobile end user via the micro cell or the macro cell, the access request including an identity of the mobile end user and an identifier of the micro cell or macro cell through which the mobile end user sent the access request;
      select a charging indication based on the identifier of the micro cell or macro cell and the identity of the mobile end user received in the access request; and
      send the selected charging indication to the core network; and wherein the core network comprises a core network node configured to:
- receive the selected charging indication from the access network node;
- select a charging rate based on the selected charging indication; and
- send the selected charging rate to the mobile end user prior to the mobile end user incurring charges for network services provided at the selected charging rate.

11. A computer program loaded on a non-transitory memory coupled to a processor of an access network controller in a cellular communications system having an access network and a core network, the computer program comprising software code portions for performing the following steps when the computer program is run on the processor of the access network controller:

receiving by the access network controller, an access request from a mobile end user via a micro cell or an overlying macro cell, wherein the micro cell and the macro cell have different charging rates, and the access request includes an identity of the mobile end user and an identifier of the micro cell or macro cell through which the mobile end user sent the access request;

selecting by the access network controller, a charging indication based on the identifier of the micro cell or macro cell and the identity of the mobile end user received in the access request;

sending the selected charging indication to the core network;

obtaining from the core network, a charging rate associated with the charging indication; and sending the associated charging rate to the mobile end user prior to the mobile end user incurring charges for network services provided at the selected charging rate.

* * * * *

UNITED STATES PATENT AND TRADEMARK OFFICE
CERTIFICATE OF CORRECTION

| | | |
|---|---|---|
| PATENT NO. | : 8,768,297 B2 | Page 1 of 1 |
| APPLICATION NO. | : 12/296439 | |
| DATED | : July 1, 2014 | |
| INVENTOR(S) | : Vikberg et al. | |

It is certified that error appears in the above-identified patent and that said Letters Patent is hereby corrected as shown below:

In the Specification

In Column 2, Line 37, delete "example." and insert -- example: --, therefor.

In Column 6, Line 3, delete "MSC" and insert -- MSC. --, therefor.

In Column 8, Line 60, delete "SL-CN" and insert -- S1-CN --, therefor.

In the Claims

In Column 10, Line 22, in Claim 6, delete "request; and," and insert -- request; and --, therefor.

Signed and Sealed this
Fourteenth Day of October, 2014

Michelle K. Lee
*Deputy Director of the United States Patent and Trademark Office*